Patented Apr. 2, 1935

1,996,361

UNITED STATES PATENT OFFICE 1,996,361

SOLDERING FLUX

Conral C. Callis and Ralph B. Derr, Oakmont, Pa., assignors to Aluminum Company of America, Pittsburgh, Pa., a corporation of Pennsylvania No Drawing. Application December 29, 1932, Serial No. 649,326. Renewed September 22, 1934

6 Claims. (Cl. 148—23)

This invention relates to soldering fluxes for use in the joining of metals and to methods of joining metals by soldering. The invention is particularly concerned with the soldering of aluminum and aluminum base alloys and other metals presenting difficult soldering problems.

The usual soldering flux is a pulverized salt or mixture of salts such as, for instance, zinc chloride, ammonium chloride, etc. In granular or powdered form the flux is often difficult to apply to the work, it has therefore been customary to mix the flux with aqueous solutions, grease, oils, waxes or the like to form a paste or liquid which is more readily applied. The vehicles heretofore mixed with the salts are not, however, wholly satisfactory. Some of them vaporize below the soldering temperature and do not spread the flux over the work. Others carbonize to a substantial extent at or below soldering temperatures, deposit a carbonaceous residue and increase the difficulty of making a satisfactory joint. Others do not adequately serve the intended purpose for these and related reasons.

We have found that a satisfactory vehicle with which to mix or in which to suspend fluxing salts so as to insure a positive spread of the flux upon the work and to obtain other and similar advantages is a vehicle of chlorinated diphenyl and para - dichlor - benzene. Chlorinated diphenyls are a class of substances ranging, in physical form, from liquids to solids, from mobile oils to thermoplastic resins. Para-dichlor-benzene is a solid substance. In its broader aspects this invention comprehends vehicles which contain any of the forms of chlorinated diphenyl when mixed with para-dichlor-benzene.

Our invention contemplates, therefore, a flux containing chlorinated diphenyl, para-dichlor-benzene, and fluxing salts. We have found that when fluxing salts are mixed with or suspended in chlorinated diphenyl and para-dichlor-benzene mixtures, the resulting flux spreads readily on the work, delivers to the work a uniform coating of the essential fluxing salts, and materially promotes ease of soldering and the production of sound joints. In such a flux we have found that the para-dichlor-benzene need not be added in amounts greater than about 35 per cent by weight of the chlorinated diphenyl present. It will be understood that the flux is applied to the work in the usual manner employed in soldering operations, as by dipping, spraying, brushing, or, if the flux is of a viscous or solid nature, by simply placing it upon the work. The preferred flux is one containing fluxing salts suspended in a liquid mixture of solid or resinous chlorinated diphenyl and para-dichlor-benzene, the para-dichlor-benzene being present in amount of about 5 to 25 per cent of the para-dichlor-benzene-plus-chlorinated diphenyl.

When these chlorinated diphenyl and para-dichlor-benzene mixtures are employed they promote the uniform spreading of the fluxing salts with which they are mixed, insure that the work is uniformly coated with the salts, and are generally beneficial in promoting the fluxing action and, consequently, the soldering action. Under their influence the solder flows more readily. Carbonization on any substantial scale is not observed and difficulties from this source are practically eliminated.

The various conditions under which soldering is accomplished make desirable the use of fluxes of different physical characteristics. A fluid or a mobile flux is often preferred to a solid form, and the type of the work in question more or less governs which physical type of flux should be used. If a mobile flux is not necessary, a suitable flux may be provided by mixing together solid or viscous chlorinated diphenyl, solid para-dichlor-benzene not more than about 10 per cent, and a granular or pulverized fluxing salt, this mixture being applied directly to the work. The soldering temperatures employed will soften such mixtures of chlorinated diphenyl and para-dichlor-benzene and thus the mixture will become sufficiently fluid to distribute the flux uniformly over the work. If it is desired to use the solid or resinous chlorinated diphenyl (as may be desirable because of their higher boiling point ranges), and at the same time have a flux which is mobile or fluid at room temperature, it will be found that when the para-dichlor-benzene mixed therewith is about 5% of the total mixture, the mixture will become pasty and will become increasingly fluid as the percentage of para-dichlor-benzene is increased up to about 30% of the total mixture. When the para-dichlor-benzene content reaches about 35% of the total mixture, the mixture becomes saturated and the para-dichlor-benzene will start to separate out of the mixture in crystalline form. Generally, however, no separation will be obtained at room temperature when the para-dichlor-benzene does not exceed about 35% of the mixture. On the other hand, when the para-dichlor-benzene is added to a fluid or liquid chlorinated diphenyl, a different range of fluidity will be obtained, and the fluidity which is obtained may be readily determined in any specific instance by a simple trial.

In the many instances in which it is desirable that the flux be more or less liquid, the flux may be formed by suspending the fluxing salts in a fluid containing chlorinated diphenyl and para-dichlor-benzene. Fluidity is desired in order that the flux may be more readily applied, but the degree of fluidity (using this term as including viscosity as well) is also of importance since a substantial proportion of the fluxing salts which are mixed with the fluid containing chlorinated diphenyl and para-dichlor-benzene should remain suspended therein for a period of time (after mixing or shaking) to allow the application of a uniform coating of the flux to the work. To obtain a fluid mixture of chlorinated diphenyl and para-dichlor-benzene, these substances may be mixed in the above indicated proportions if both are solids, or, if the chlorinated diphenyl is a fluid, the para-dichlor-benzene may be added thereto in proportions which will not destroy that fluidity. In this manner it is not only possible to secure fluidity but in many cases the particular degree of fluidity which is most desirable. At any rate if the resultant fluidity is not that desired it may be adjusted by adding to the mixture a thinner in the form of organic solvent. Likewise viscous or solid mixtures of chlorinated diphenyl and para-dichlor-benzene may be made fluid and this fluidity adjusted by adding a like thinner to the mixture.

Thinning agents by which the fluidity of the chlorinated diphenyl-plus-para-dichlor-benzene mixture may be adjusted are the organic solvents, comprehending, among other substances, benzol, toluol, xylol and like aromatic hydrocarbons, carbon tetrachloride, cyclo-hexanol, mineral oils (preferably highly refined) and similar solvents. Thus in one form the invention contemplates the use of a flux containing mixtures of chlorinated diphenyl and para-dichlor-benzene the fluidity of which has been adjusted by an organic solvent.

We claim—

1. In a method of soldering, the step of applying to the metal to be soldered a flux containing chlorinated diphenyl and para-dichlor-benzene.

2. In a method of soldering, the step of applying to the metal to be soldered, fluxing salts mixed with chlorinated diphenyl and para-dichlor-benzene, the fluidity of the flux having been adjusted with organic solvent.

3. A soldering flux containing chlorinated diphenyl and para-dichlor-benzene, the fluidity of the flux being adjusted with organic solvent.

4. A soldering flux containing chlorinated diphenyl and para-dichlor-benzene.

5. A soldering flux comprising fluxing salts, chlorinated diphenyl, and para-dichlor-benzene.

6. A soldering flux comprising fluxing salts, chlorinated diphenyl, and para-dichlor-benzene, the fluidity of the flux being adjusted with organic solvent.

CONRAL C. CALLIS.
RALPH B. DERR.